(12) United States Patent
Chen et al.

(10) Patent No.: US 7,803,744 B2
(45) Date of Patent: Sep. 28, 2010

(54) CARBON DIOXIDE FOAMED FLUIDS

(75) Inventors: Yiyan Chen, Richmond, TX (US); Jesse Lee, Sugar Land, TX (US); Timothy L. Pope, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 11/858,246

(22) Filed: Sep. 20, 2007

(65) Prior Publication Data

US 2008/0070812 A1    Mar. 20, 2008

Related U.S. Application Data

(63) Continuation of application No. 10/860,855, filed on Jun. 4, 2004, now Pat. No. 7,291,651.

(60) Provisional application No. 60/527,552, filed on Dec. 5, 2003.

(51) Int. Cl.
*C09K 8/518* (2006.01)
*C09K 8/60* (2006.01)

(52) U.S. Cl. .............. 507/204; 507/241; 507/249; 507/904

(58) Field of Classification Search ............. 507/240, 507/241, 249, 904
See application file for complete search history.

(56) References Cited

U.S. PATENT DOCUMENTS

| | | | |
|---|---|---|---|
| 4,113,631 A | | 9/1978 | Thompson |
| 4,480,696 A | * | 11/1984 | Almond et al. ......... 166/308.6 |
| 4,737,296 A | * | 4/1988 | Watkins .................. 507/202 |
| 5,258,137 A | | 11/1993 | Bonekamp |
| 5,551,516 A | | 9/1996 | Norman |
| 5,964,295 A | | 10/1999 | Brown |
| 6,258,859 B1 | | 7/2001 | Dahayanake |
| 6,306,800 B1 | | 10/2001 | Samuel |
| 6,435,277 B1 | | 8/2002 | Qu |
| 6,446,727 B1 | | 9/2002 | Zemlak |
| 6,840,318 B2 | | 1/2005 | Lee |
| 7,084,095 B2 | | 8/2006 | Lee |
| 2003/0134751 A1 | | 7/2003 | Lee |
| 2004/0097385 A1 | | 5/2004 | Chen |
| 2005/0252659 A1 | | 11/2005 | Sullivan |
| 2006/0157248 A1 | | 7/2006 | Hoefer |
| 2006/0185842 A1 | | 8/2006 | Chen |
| 2008/0200353 A1 | * | 8/2008 | Dahayanake et al. ........ 507/240 |

* cited by examiner

*Primary Examiner*—Timothy J. Kugel
(74) *Attorney, Agent, or Firm*—Martin Rzaniak; David Cate; Robin Nava

(57) ABSTRACT

An aqueous viscoelastic surfactant (VES) fluid foamed or energized with carbon dioxide, in which the VES is more compatible with the carbon dioxide, is made by the addition of one or more than one synergistic co-surfactant. The synergist co-surfactant includes quaternary amines and ethoxylated carboxylates having a hydrophobic chain shorter than the hydrophobic chain of the VES. Improved compatibility is evidenced for a given surfactant concentration either by formation and maintenance of a foam under conditions at which the foam could not otherwise have been formed or maintained, or by either higher viscosity of the foamed fluid at a given temperature or longer foam life at a given temperature or a higher temperature at which useful fluid viscosity can be generated or maintained for a useful time. The aqueous carbon dioxide foamed fluids may be used in acidizing, acid fracturing, gravel packing, diversion, and well cleanout.

4 Claims, 9 Drawing Sheets

DMB

LEC

CARBON DIOXIDE FOAMED FLUIDS

CROSS-REFERENCE TO RELATED APPLICATION

This application is a continuation of the U.S. patent application Ser. No. 10/860,855, filed on Jun. 4, 2004, now granted under U.S. Pat. No. 7,291,651 and claims the benefit of U.S. Provisional Patent Application No. 60/527,552, filed on Dec. 5, 2003 and now expired.

TECHNICAL FIELD OF THE INVENTION

This invention relates generally to viscous fluids foamed or energized with carbon dioxide and to methods of their use.

BACKGROUND OF THE INVENTION

Foamed fluids are used in many applications, for example as fracturing fluids in the oil field. Although such fluids are commonly called foams, when the second phase is $CO_2$ the fluids are more like an emulsion of water and supercritical $CO_2$ under most application conditions. Furthermore, when the fraction of the non-aqueous phase (called the "foam quality" and sometimes abbreviated here as FQ) is less than about 54%, such fluids are commonly called "energized". When we say "foamed" we include any quality, including an emulsion; when we say "energized' we mean a quality of less than about 54%. $CO_2$ "foamed" fracturing fluids are often preferred over $N_2$ (or other gas) foamed fracturing fluids under certain circumstances. For instance, $CO_2$ provides additional cleanup energy (relative to $N_2$) when it is gasified as the pressure drops after a treatment is completed. Also, for deeper and hotter wells, $CO_2$ foamed fluids require less horsepower due to their higher density than $N_2$ foamed fluids of equal foam quality. Therefore $N_2$ fluids are rarely pumped over about 180° F. (about 82° C.), and $CO_2$ fluids are routinely used up to about 240° F. (about 116° C.) and higher.

It is a desirable feature to have a fracturing fluid compatible with $CO_2$. Surfactant-based fluids ("VES" or "viscoelastic surfactant" fluids) provide many benefits over conventional polymer fluids when used in fracturing (and for other uses), but most VES fluids are not very compatible with $CO_2$. Not to be limited by theory, but it is believed that this is because the solvency of supercritical $CO_2$ disrupts the micellar structure (for example but not limited to a worm-like micelle structure) that is essential for fluid viscosity. It would be advantageous to make VES/$CO_2$ foamed fluids stable for longer times and/or at higher temperatures.

SUMMARY OF THE INVENTION

One embodiment of the invention is a fluid composition containing a viscoelastic surfactant and a synergistic co-surfactant. In another embodiment the composition also contains water; the viscoelastic surfactant is present in a concentration of from about 0.3 to about 10%; the synergistic co-surfactant is present in a concentration of from about 0.008 to about 4%; and the ratio of surfactant to synergistic co-surfactant is from about 5:1 to about 15:1. In another embodiment the fluid composition is foamed or energized with carbon dioxide in a separate phase, for example with a foam quality of from about 30 to about 80%. The viscoelastic surfactant and the synergistic co-surfactant co-operatively stabilize the carbon dioxide-water interface and the synergistic co-surfactant improves the compatibility of the viscoelastic surfactant with the carbon dioxide.

In yet another embodiment, the viscoelastic surfactant is a zwitterionic surfactant that has the formula:

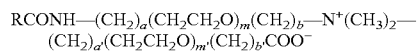

in which R is an alkyl group that contains from about 17 to about 23 carbon atoms which may be branched or straight chained and which may be saturated or unsaturated; a, b, a', and b' are each from 0 to 10 and m and m' are each from 0 to 13, provided that both m and m' are not equal to 0; a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 1 to 14; and $CH_2CH_2O$ may also be $OCH_2CH_2$. As an example, the surfactant is a betaine, for further example oleylamidopropyl betaine or erucylamidopropyl betaine.

In yet another embodiment the synergistic co-surfactant is quaternary amine surfactant in which the cation is

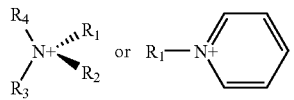

in which $R_1$, $R_2$, $R_3$, and $R_4$ are each alkyl, alkenyl, arylalkenyl, or hydroxyalkyl, each having from 1 to about 22 carbon atoms and being saturated or unsaturated and branched or straight chained, and $R_1$ may also be alkylaminoalkyl and alkylamidoalkyl. The synergistic co-surfactant may also be an ethoxylated anionic surfactant, having the general formula $R-(CH_2CH_2-O)_n-COO^-M^+$ in which R is an alkyl chain having from about 6 to about 22 carbon atoms, that can be straight chained or branched, and saturated or unsaturated and n has a value of from about 0 to about 30. The synergistic co-surfactant can also contain a mixture of either or both of the amine cation types shown, or a mixture of the ethoxylated anions, or a mixture of the amines and the anions. The synergistic co-surfactant may also be an oligomer or polymer of the monomeric examples above or of other materials such as polymers that have carbon dioxide-phillic region or regions and a hydrophilic region or regions, such as polypropylene oxide and vinyl alcohol vinyl acetate copolymer.

In yet another embodiment, the surfactant is BET-E-40 and the synergistic co-surfactant is $C_{12}$ alkyl dimethyl benzyl ammonium chloride, sodium laureth-13 carboxylate or a mixture of the two.

A further embodiment is a method of increasing the compatibility of an aqueous fluid, containing the surfactants described above, with carbon dioxide which includes adding a sufficient amount of the synergistic co-surfactant.

Among the uses of these fluids is a method of treating a subterranean formation penetrated by a wellbore, or of treating the wellbore itself, by injecting the carbon dioxide foamed fluid into formation or wellbore. Zirconium oxychloride may be used as a clay stabilizing agent in these uses.

DETAILED DESCRIPTION OF THE INVENTION

Figure 1:
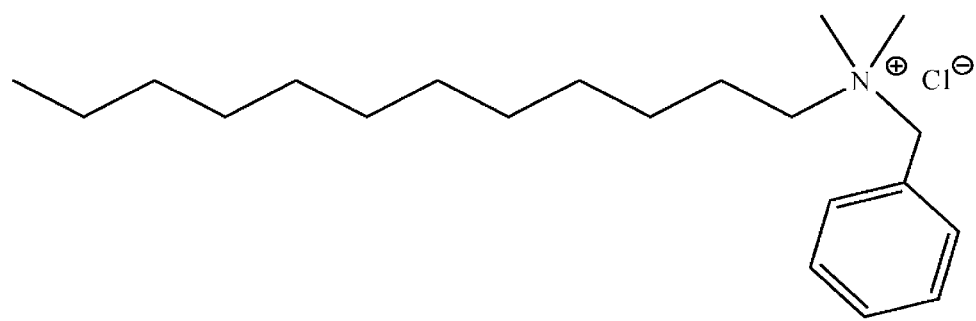
FIG. 1 shows representative examples of suitable synergistic co-surfactants.
Figure 1:
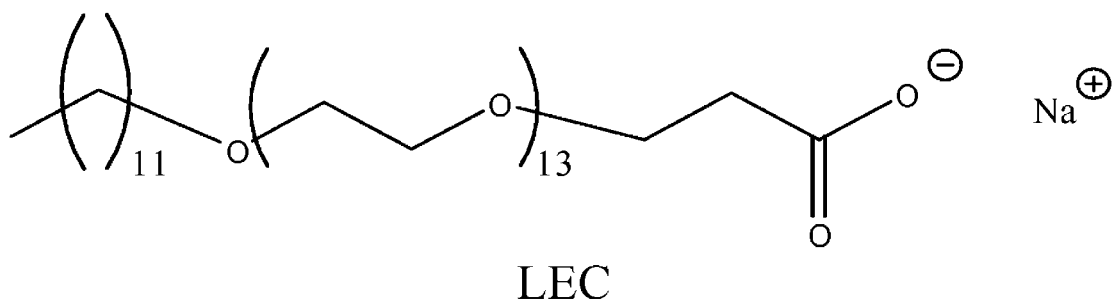

VES/$CO_2$ foamed fluids will be described primarily in terms of their use as fracturing fluids, although the invention should not be limited to fracturing fluids and fracturing. $CO_2$ fractures target primarily low pressure or depleted wells. For such wells, there is often not enough reservoir pressure to push the fracture fluid back to the surface after a job. In order to improve cleanup of any well, fracture fluids may be energized or foamed to compensate for low pressure; the gas included in the fluid system flows back to the well as the pressure is released.

$N_2$ and $CO_2$ are most commonly used as foaming gases. $CO_2$ foamed fluids have several advantages over $N_2$ foamed fluids. They have a lower hydraulic horsepower requirement. $CO_2$ has a higher molecular weight than $N_2$ and has a higher boiling point so it is more easily liquefied. At typical fracturing conditions, $CO_2$ is in the liquid or supercritical state; these are denser states than the gas state. Therefore a fracturing fluid foamed with $CO_2$ can create more hydrostatic pressure than one foamed with $N_2$. In fact, $N_2$ foamed fluids are so light that when the temperature is above about 180° F. (about 82° C.), the horsepower requirements for pumping them becomes economically unfavorable, and treating equipment pressure requirements become unfeasible. Furthermore, $CO_2$ has a higher solubility in aqueous media which makes it easier to pump higher foam quality fluids.

$CO_2$ also generates more energy down hole. Since the $CO_2$ pumped down hole is in a liquid or supercritical phase, when the pressure is released or the temperature is increased, the $CO_2$ gasifies. A small amount of liquid or supercritical $CO_2$ occupies much larger volumes when it turns into a gas. It creates a higher pressure-gradient for flow back per unit loading of $CO_2$.

$CO_2$ also gives better cleanup, i.e. causes less formation damage. Since $CO_2$ is more soluble in aqueous fluids and easier to liquefy, higher foam quality fluids can easily be achieved. This reduces the total liquid load for each fracture job. With less loading, the likelihood of formation damage is reduced. Furthermore, because of the high solubility of $CO_2$ in aqueous fluids, the fluid leaked out into the formation always contains some dissolved $CO_2$. When this portion of the $CO_2$ gasifies, it helps to clean up the fluid in the formation farther away from the wellbore. Finally, many unfoamed or $N_2$— foamed polymer-based fluids are basic, but the pH of $CO_2$ fluids is normally about 4 because of the high concentration of dissolved $CO_2$. This acidic environment limits the swelling of some formation clays.

Traditionally, linear and crosslinked polymers have dominated the market for viscosifiers for $CO_2$ foams. However, foams based on viscoelastic surfactants (VES's) have good proppant transport properties, excellent retained permeability, are simple and robust to prepare and use, and all the components except the water (and any salt added to the water to make a brine) and $CO_2$ can optionally be premixed in a single concentrate.

When a fracturing fluid is mixed with $CO_2$ and pumped down hole, the surface treating pressures are usually a few thousand psi (a few tens of MPa) (the pressure is higher at bottom hole due to the hydrostatic pressure of the fluid inside the tubulars). Under these conditions, $CO_2$ is in a liquid state below 88° F. (31° C.). When the temperature is above 88° F. (31° C.) and the pressure is lower than about 90,000 psi (about 600 MPa), the $CO_2$ is in a supercritical state. Thus $CO_2$ fracturing fluids are normally supercritical. Supercritical $CO_2$ has unique chemical and physical properties that are used to advantage in embodiments of the present invention. In this state, it has the solvating power of a liquid and the diffusivity of a gas.

It has now been found that certain chemical compounds can be added to VES fluids to take advantage of synergistic effects and make them more compatible with $CO_2$. That is, certain VES fluids that are not compatible or are not very compatible with $CO_2$ can be made compatible, or more compatible, by the addition of these materials, that we will call "synergistic co-surfactants" here. The "improved compatibility" may be demonstrated for a given surfactant concentration either by formation and maintenance of a foam under conditions at which the foam could not otherwise have been formed or maintained (making the VES/$CO_2$ system compatible where otherwise it was not); or by either higher viscosity of the foamed fluid at a given temperature, longer foam life at a given temperature, or a higher temperature at which useful fluid viscosity can be generated or maintained for a useful time (making the VES/$CO_2$ system more compatible than it would have been without the synergistic co-surfactant material).

It should be repeated that, in addition, the VES/$CO_2$ systems containing synergistic co-surfactants of embodiments of the invention demonstrate enhanced performance (relative to analogous fluids foamed with nitrogen) when they are energized with $CO_2$. The fluid performance can be adjusted with the fraction of $CO_2$ in the system. Up to about 80% $CO_2$, when the synergistic co-surfactant is present an increase in the fraction of $CO_2$ results in higher viscosities and better foam stabilities compared to unfoamed or $N_2$-foamed fluids, provided that the $CO_2$ is supercritical.

Suitable surfactants have a relatively good ability to form viscoelastic aqueous gels and have a relatively good affinity for $CO_2$. Suitable synergistic co-surfactants have shorter hydrophobic chains and a greater affinity for $CO_2$ than the surfactants. Head groups for the synergistic co-surfactants that have a suitable affinity for $CO_2$ include carboxyl or carboxylate groups, fluorine-containing groups, silicon-containing groups, and quaternary ammonium groups. Synergistic co-surfactants may also be oligomers and polymers, for example oligomers or polymers of polypropylene oxide, and co-oligomers or copolymers of polyvinyl alcohol with polyvinyl acetate. Such oligomers and polymers have a region or regions that are preferably attracted to carbon dioxide relative to water and a region or regions that are preferably attracted to water relative to carbon dioxide. Short chain amphiphiles may also be used. The combination of surfactant and synergistic co-surfactant stabilizes the $CO_2$/$H_2O$ interface.

Several types of zwitterionic surfactants have been found to be particularly useful in forming stable foamed VES/CO$_2$ systems when the synergistic co-surfactants described above are used. In general, suitable zwitterionic surfactants have the formula:

RCONH—(CH$_2$)$_a$(CH$_2$CH$_2$O)$_m$(CH$_2$)$_b$—N$^+$(CH$_3$)$_2$— (CH$_2$)$_{a'}$(CH$_2$CH$_2$O)$_{m'}$(CH$_2$)$_{b'}$COO$^-$ in which R is an alkyl group that contains from about 17 to about 23 carbon atoms which may be branched or straight chained and which may be saturated or unsaturated; a, b, a', and b' are each from 0 to about 10 and m and m' are each from 0 to about 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and CH$_2$CH$_2$O may also be OCH$_2$CH$_2$. Preferred surfactants are betaines.

Two examples of betaines are, respectively, BET-O-30 and BET-E-40. The VES surfactant in BET-O-30 is shown below; one chemical name is oleylamidopropyl betaine. It is designated BET-O-30 because as obtained from the supplier (Rhodia, Inc. Cranbury, N.J. U. S. A.) it is called Mirataine BET-O-30; it contains an oleyl acid amide group (including a C$_{17}$H$_{33}$ alkene tail group) and is supplied as about 30% active surfactant; the remainder is substantially water, sodium chloride, glycerol and propane-1,2-diol. An analogous material, BET-E-40, is also available from Rhodia and contains an erucic acid amide group (including a C$_{21}$H$_{41}$ alkene tail group) and is about 40% active ingredient, with the remainder being substantially water, sodium chloride, and isopropanol. (This material is termed "formulation 1" in the experiments described below.) The surfactant in BET-E-40 is also shown below; one chemical name is erucylamidopropyl betaine. BET surfactants, and others that are suitable, are described in U.S. Pat. No. 6,258,859, hereby incorporated by reference in its entirety.

Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS, shown below). VES's may be used with or without this type of co-surfactant, for example those having a SDBS-like structure having a saturated or unsaturated, branched or straight-chained C$_6$ to C$_{16}$ chain; further examples of this type of co-surfactant are those having a saturated or unsaturated, branched or straight-chained C$_8$ to C$_{16}$ chain. Other suitable examples of this type of co-surfactant, especially for BET-O-30, are certain chelating agents such as trisodium hydroxyethylethylenediamine triacetate. Note that this type of co-surfactant is not the same type of co-surfactant as the "synergistic co-surfactants" of embodiments of the current invention.

Experiments described below used BET-E-40 although other VES's may be used. Although experiments have not been performed, it is believed that mixtures of BET-E-40 with other surfactants (including both betaines, such as BET-O-30, and other types) form foamed VES/CO$_2$ systems that are more stable than foamed VES/CO$_2$ systems made with the other surfactants but without the addition of BET-E-40. Such mixtures are within the scope of embodiments of the present invention.

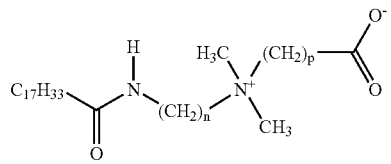

Surfactant in BET-O-30 (when n = 3 and p = 1)

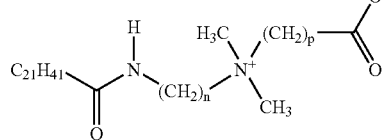

Surfactant in BET-E-40 (when n = 3 and p = 1)

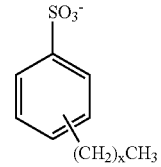

SDBS (when x = 11 and the counter ion is Na$^+$)

Betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. As a further example, suitable betaines include those in which the alkene side chain contains 17-21 carbon atoms (not counting the carbonyl carbon atom) which may be branched or straight chained and which may be saturated or unsaturated, n=3-5, and p=1-3, and mixtures of these compounds.

Examples of two classes of compounds that are suitable synergistic co-surfactants for creating or improving the compatibility and thus performance of VES/CO$_2$ systems follow. The first class is certain quaternary amine surfactants having either of the generic formulas for the cation:

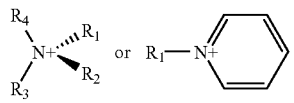

in which R$_1$, R$_2$, R$_3$, and R$_4$ can be alkyl, alkenyl, arylalkenyl, and hydroxyalkyl having from 1 to about 22 carbon atoms and can be saturated or unsaturated and branched or straight chained. R$_1$ can also be alkylaminoalkyl and alkylamidoalkyl. The anion may be inorganic (such as Cl$^-$, and Br$^-$) and organic (such as acetate and other organic acid groups). An example of such a synergistic co-surfactant is an alkyl dimethyl benzyl ammonium chloride having an alkyl group that is saturated and straight-chained and has about 8 to 16 carbon atoms, or having an alkyl group that is a mixture of saturated and straight-chained alkyl groups having about 8 to 16 carbon atoms. One example of such compounds is C$_{12}$ alkyl dimethyl benzyl ammonium chloride, obtained from Rhodia, Inc. Cranbury, N.J. U. S. A. under the trade name Alkaquat DMB 80, which will be called "DMB" here The second class is ethoxylated anionic surfactants of the general formula:

R—(CH$_2$CH$_2$—O)$_n$—CH$_2$CH$_2$COO$^-$M$^+$ having an alkyl chain R of from about 6 to about 30 carbon atoms, that can be straight chained or branched, and saturated or unsaturated, and a value of n from 0 to about 20. The cation can be inorganic (for example $K^+$, $Na^+$, and $Cs^+$) and organic (for example quaternary amine). An example is sodium laureth-13 carboxylate, sold by Rhodia, Inc. Cranbury, N.J. U.S.A. under the trade name Miranate LEC-80, and hereinafter referred to as "LEC". LEC has a $C_{12}$ straight chained alkyl group, 13 ethoxy groups and a sodium cation. As received, Miranate LEC-80 is about 79% active ingredient and also contains mixed alcohol and water.

Mixtures of more than one member of either class or of one or more members of each of the two classes of synergistic co-surfactants may also be used. A typical foamed VES fluid has about 0.3 to about 10 weight percent VES (expressed as active surfactant in the aqueous phase of the foamed fluid, not as as-received surfactant), and about 0.008 to about 4 weight percent synergistic co-surfactant (expressed as synergistic co-surfactant in the aqueous phase of the foamed fluid). In another example, concentrations are about 0.6 to about 1.6 weight percent VES, and about 0.08 to about 0.4 weight percent synergistic co-surfactant. The ratio of surfactant to synergistic co-surfactant is typically from about 5:1 to about 15:1, for example from about 7.5:1 to about 10:1. The volume percent $CO_2$ ("foam quality") is from about 30 to about 85 percent, for example from about 60 to about 75 percent.

Representative examples of suitable synergistic co-surfactants are shown in FIG. 1, in which DMB is $C_{12}$ alkyl dimethyl benzyl ammonium chloride, and LEC is sodium laureth-13 carboxylate. Oligomers and polymers of these materials may also be used.

The water that can be used may be any water, such as municipal water, lake or stream water, sea water or brine. For optimal performance, VES/$CO_2$ foamed fluids made with BET-E-40 should contain about 2% KCl. Suitable concentrations of any added materials, such as salts, acids, mutual solvents, alcohols, and others, may readily be determined by simple experiments such as those describe below.

The new VES/$CO_2$ systems are used in the same way as other energized or foamed systems are used, for example in the oilfield in such operations as fracturing, and in other industrial uses. No special equipment or procedures are needed. The major difference is the inclusion of the synergistic co-surfactant, and in adjustments to the component concentrations or to the job designs that may be required as a result of the better performance. Normally the synergistic co-surfactant is premixed with the VES surfactant in a concentrate that is then added to water, before or after other components that are typically used in such formulations (like iron controllers, biocides, foaming agents, corrosion inhibitors, proppants, clay control agents, and others). Optionally some of these other components may also be included in the concentrate. The synergistic co-surfactant may, however, be added premixed with any other component or components, for example as a concentrate, or may be added to the fluid separately.

In addition to fracturing, these fluids may be used in many other oilfield applications such as but not limited to acidizing, acid fracturing, gravel packing, diversion, and well cleanout. They may of course also be used in treatments of other types of wells such as but not limited to wells for the production of hydrocarbon gas, distillate, helium, carbon dioxide, water, and other materials, and in injection wells for enhanced recovery, storage, or disposal.

Another use is for equilibrium-controlled controlled release of acid for acidizing. For example, in a reaction like that of HCl with $CaCO_3$, $CO_2$ is generated; having a high concentration of $CO_2$ in the system drives the equilibrium reaction backward, therefore suppresses the reaction rate (retards the reaction). When this is well controlled, the reaction rate can be tuned by varying the $CO_2$ partial pressure. This feature is used for example to improve efficiency, to control fluid placement, and to control wormholing. Other industrial uses of $CO_2$ foams that can be improved include, by non-limiting example, use as a super solvent for difficult-to-dissolve compounds, use as a removable solvent template to generate uniformly structured porous materials, use for blending two immiscible polymers, and use in creating controlled-release coatings for drugs.

In oilfield operations it is very common to use clay control agents such as potassium chloride or tetramethyl ammonium chloride. It is known that zirconium oxychloride is an excellent clay stabilizer that can be very inexpensive to use because it can be used at very low concentrations. However, it can only very rarely be used with most polymer based viscous fluids because zirconium is a crosslinker for such polymers as polysaccharides. Zirconium oxychloride can be used as a clay control agent in fluids and methods of embodiments of the invention, provided that it does not interfere with the ability of the specific synergistic co-surfactant/VES system to form a viscoelastic foamed fluid. This should be tested in the laboratory before use.

Experimental:

Unfoamed fluids were prepared using a Waring blender equipped with a Variac. Unfoamed fluid viscosities were measured with a Fann 50 viscometer according to API standards. Unfoamed fluid dynamic rheology and low-shear rheology was measured with a Bohlin Rheometer using a bob and cup geometry. $CO_2$ foamed fluid viscosities were measured with a Chandler Foam Rheometer.

To make a typical unfoamed fluid, 200 ml of tap water was added to a 1L Waring blender cup. To this fluid, 4 g (2%) of KCl salt was added and dissolved, and 7 ml (3.5%) of a VES concentrate was then added with gentle stirring. The fluid was blended with a Variac set to 30% to 40% of the full speed for 5 minutes, then with the Variac set to 60% for 40 seconds.

Surfactant concentrates from which VES fluids were made are called formulations. Formulation 1 contained only as-received betaine surfactant BET-E-40. When fluids made with 3% formulation 1 were foamed with $CO_2$, the fluid viscosities remained low (~50 cP) as the temperature was increased until the temperature was above about 200° F. (about 93° C.). Note that the foam qualities increased during such a test as the temperature was raised; foam quality increases also contributed to the fluid viscosity increases observed here. The fluid viscosity then remained above 100 cP until the temperature reached about 270° F. (about 132° C.). In order for a fluid to be useful as a fracturing fluid at about 200° F. (about 93° C.), it should have good viscosity below that temperature, so that it can carry proppant before it reaches high temperature. Therefore formulation 1 alone is unsatisfactory for making good VES/$CO_2$ fluids for fracturing.

Figure 2:
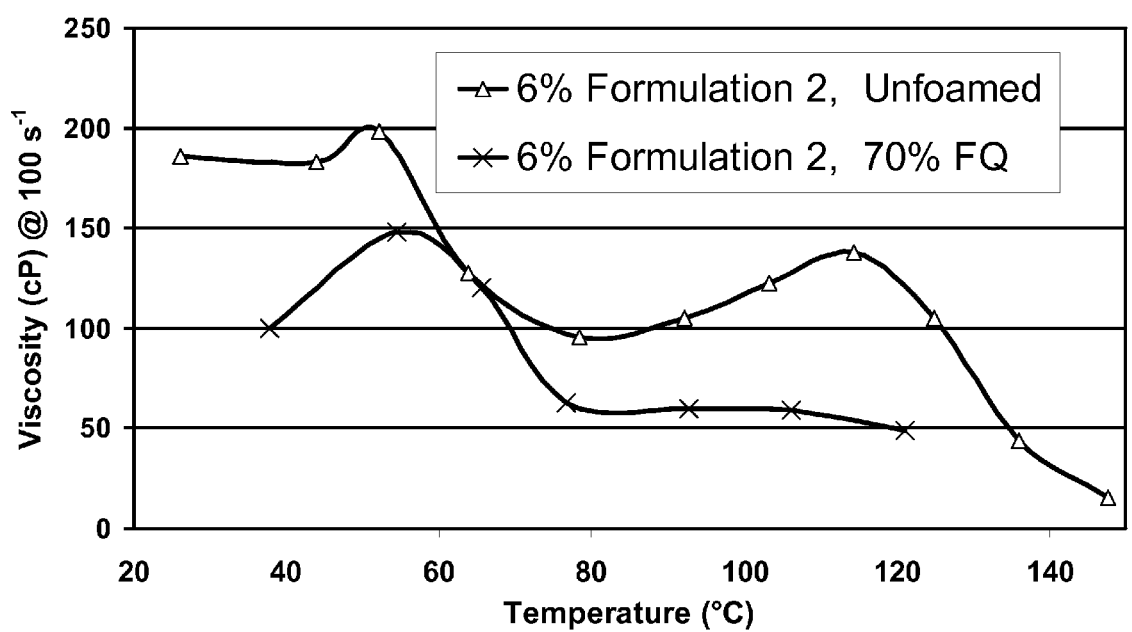
FIG. 2 shows temperature profiles of unfoamed and $CO_2$ foamed fluids made without a synergistic co-surfactant.

Formulation 2 was as-received betaine surfactant BET-E-40 containing about 1% of DAXAD 17, a low molecular weight sodium polynaphthalene sulfonate available from Hampshire Chemical Corporation, Nashua, N.H., USA. As shown in FIG. 2, a $CO_2$ fluid made with 6% formulation 2 did not give good viscosity throughout the whole temperature range studied. The viscosity increased with temperature up to about 130° F. (about 54° C.) but then decreased with further increasing temperature; it decreased to less than about 50 cP as the temperature increased to above no more than about 240° F. (about 116° C.). However, the foam did not look stable and drainage defoaming could be seen during the test when the foam was observed in a high temperature cell; drainage de-foaming was clearly visible after the fluid was isolated in the cell for a few minutes. Formulation 2 is therefore considered insufficiently compatible with $CO_2$.

The DAXAD had been added to formulation 1 to decrease the shear recovery time of the fluid (not shown) but it also decreased the viscosity of the $CO_2$ foamed fluid. We have found that a small amount of the proper synergistic co-surfactant in a VES system acts as a shear-recovery additive as well as an agent to maintain and even improve the viscosity and foam stability. An example of such a synergistic co-surfactant is the cationic surfactant Alkaquat DMB 80. Not to be limited by theory, but it is believed that the addition of the DMB changed the distribution of the surfactants on the $CO_2$/water interface. The resulting VES fluid was compatible with $CO_2$ and was particularly suitable as a fracture fluid when the foam quality was from about 60% to about 80%. Fluid viscosity could be maintained above 100 cP from room temperature up to at least about 250° F. (about 121° C.). It is estimated that the DMB extended the useful temperature of the fluid by at least about 50° F. (about 38° C.). The concentrations of VES used in these experiments were about half the concentrations sometimes used in unfoamed fracturing fluids. If the higher concentrations are used in foamed fluids containing DMB the fluids are expected to perform well at temperatures approaching about 300° F. (about 149° C.). The addition of DMB may in some cases impair the unfoamed fluid viscosity at high temperatures, but such a fluid when foamed with $CO_2$ will none-the-less have an extended temperature stability range.

For fluids made with BET-E-40 and DMB, it was found that there was a close relationship between the performance of an unfoamed fluid and that of a $CO_2$ foamed fluid. (A satisfactory unfoamed fluid means the fluid has both satisfactory viscosity and satisfactory viscoelasticity. Fluids made with the synergistic co-surfactants of embodiments of the invention are not only viscous but viscoelastic.) As a result of this relationship it was assumed that if the viscosity of an unfoamed fluid was satisfactory, the $CO_2$ foamed fluid viscosity and stability would also be satisfactory. This relationship greatly simplified the developmental process. Most screening tests were done using tests of unfoamed fluids. Foamed fluids were used only for spot checks during the screening. Therefore, most of the results presented below were obtained with unfoamed fluids.

Figure 3:
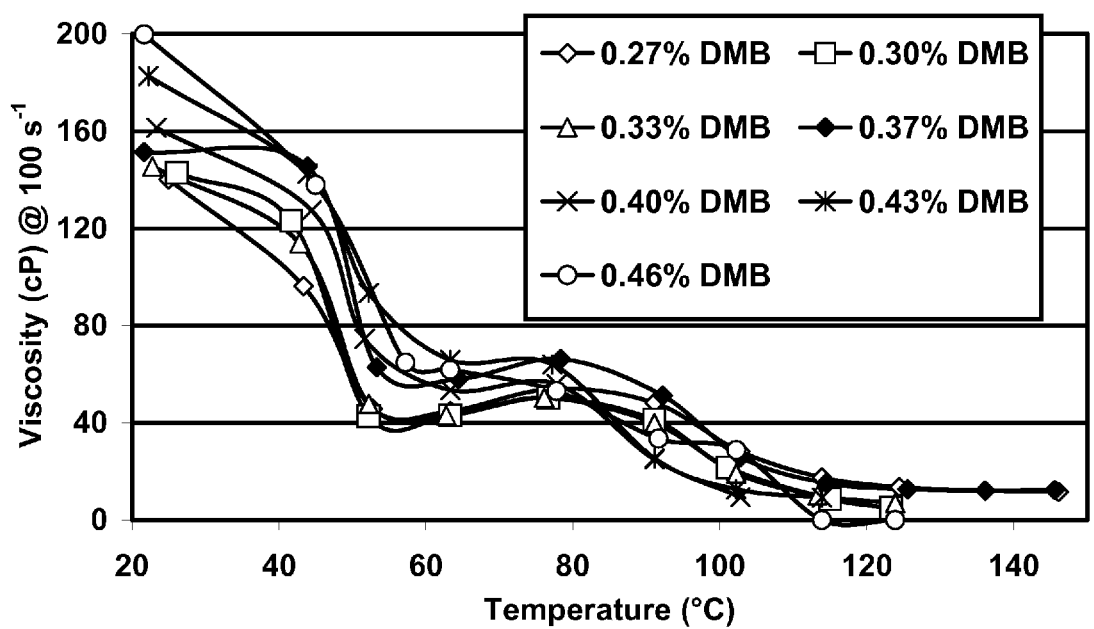
FIG. 3 shows viscosity temperature profiles for unfoamed fluids having varying ratios of synergistic co-surfactant to surfactant.

Fluids were prepared having varying ratios of DMB to formulation 1 to find the ratio giving the optimal viscosity profile and optimal shear recovery time under these conditions. Shown in FIG. 3 are the viscosity temperature profiles of these tests with fluids containing 3% formulation 1 and 2% KCl. It is clear that the ratio affected the viscosity performance. More DMB usually boosted the low-temperature viscosity (and shortened the shear recovery time as well) but usually deleteriously affected the high-temperature performance. The results were spot checked with a foam rheometer (data not shown). In balancing all the properties, a DMB/formulation 1 volume ratio of 0.123 was chosen for more thorough testing. This material, termed formulation 3, contained 89% of formulation 1 and 11% of the Alkaquat DMB 80.

The viscosity vs. temperature behavior of fluids having different KCl concentrations (3.37% formulation 3 for all samples) was investigated. It was found that 2% KCl was an excellent concentration for this particular fluid to show good viscosity over the entire temperature range of 75 to 250° F. (24 to 121° C.). It was also found that the fluid performance was satisfactory up to a KCl concentration of about 4%. This gives some room for jobs when a higher clay stabilizer concentration is needed. It should also be kept in mind that the performance is related to both the DMB/formulation 1 ratio and the KCl concentration. If a very high KCl concentration were needed for a $CO_2$ fracturing fluid, the DMB/formulation 1 ratio may be adjusted to re-optimize the performance by simple viscosity measurements.

Mixing water contaminant type and concentration vary greatly on location, so determination of the effects of common contaminants on fluids made with any VES/synergistic co-surfactant combination could be important. The common contaminants sulfate, bicarbonate, iron ion, calcium and magnesium were investigated with fluids made from 3.37% formulation 3 and 2% KCl. The highest concentrations selected for the tests were normally higher than those that are commonly seen in the field.

With increasing concentrations of $K_2SO_4$ up to 4000 ppm (much higher than normally seen in formation water), there was almost no effect on the unfoamed fluid viscosity profile. Sodium bicarbonate (up to 2000 ppm) had almost no effect on these fluids made with formulation 3. Up to 500 ppm, ferric ion showed no effect on unfoamed fluids made with formulation 3.

Examination of several fluids having varying calcium concentrations showed that when the calcium concentration was 100 to 500 ppm, there was a slight detrimental effect on the fluid viscosity, but the effect virtually disappeared when the calcium concentration was 1000 ppm or higher. Magnesium behaves like calcium under most conditions.

When 500 ppm calcium was added to a fluid made with formulation 3 and the fluid was foamed with $CO_2$, the foamed fluid showed insignificant differences in rheology compared to the same fluid without calcium added. It is believed that the $CO_2$ dissolved in the solution will overwhelm the levels of calcium or magnesium that would be found in frac water. All the calcium ions (or magnesium ions) had been converted to calcium (magnesium) carbonate or bicarbonate. Converting to carbonate would cause the calcium to precipitate out of the solution while converting to bicarbonate would have a minimal impact on the fluid rheology. Therefore no effect was found. This might not be true for every surfactant/synergistic co-surfactant combination at high calcium or magnesium concentrations and should be tested for each fluid.

Foamed fluids actually contain only a small fraction of the aqueous phase, especially when the foam quality is high. This alone limits the amount of fluid left in the formation after a treatment and thus minimizes the damage that could be done. During the flow back stage, when the surface pressure is reduced, the gas in the foamed fluid flows back and at the same time carries the aqueous fluid back to the surface. For $N_2$ foam, there is not much of the dissolved gas in the fluid; if a certain amount of aqueous phase leaks out into the formation, it may not be carried back out of the formation by the amount of gas that can be formed. As mentioned earlier, foamed VES/$CO_2$ fluids, such as fluids made with synergistic co-surfactants, are more like emulsions than like fluids foamed with a gas. Therefore, any fluid leaked off into the formation inherently contains a substantial amount of supercritical $CO_2$ as emulsion droplets. This provides deeper cleanup of the formation since the liquid droplets in an emulsion have less of a tendency to be separated from the aqueous phase of the system during leak off than does the gas phase of a $N_2$ foam. Furthermore, $CO_2$ has a much higher solubility in an aqueous fluid than does $N_2$, so even if there is no $CO_2$ present as emulsion droplets, the fluid leaked out into the formation always has a certain amount of dissolved $CO_2$. When the pressure is released, or the temperature is increased, the $CO_2$ gasifies from any aqueous phase that has leaked off and helps to bring it back. The cleanup is thus usually much better than cleanup of $N_2$ foamed fluids. In most cases, for these reasons, no breaker is needed. Furthermore, since $CO_2$ increases the viscosity when it is dissolved in VES fluids, for hydraulic fracturing the unfoamed fluid viscosity is designed to be low when the $CO_2$ in the fluid has been depleted and when the fluid has warmed up to the formation temperature; thus the fluid viscosity is low when most of the $CO_2$ has flowed back and this facilitates cleanup.

However, in some cases, it is still desired to have a breaker to help thin the fluid to facilitate the flowback. Breakers for fluids made with formulation 3 have been investigated. Examples of suitable breakers for fluids made with formulation 3 are NISB (non-ionic surfactant blend) and EPNS (encapsulated polynaphthalenesulfonate). NISB is approximately 10% butan-1-ol, 25% 2-butoxyethanol, 15% water, 8.5% of a mixture of linear and branched $C_{11}$ alcohol ethoxylates having about 3 ethoxy units, 39% of linear and branched $C_{11}$ alcohol ethoxylates having about 8 ethoxy units, and 2.5% undecanol. EPNS is approximately 7-8% sodium 2-naphthalenesulfonic acid, 2-8% water, 4-10% sodium sulfate, and 55-65% sodium polynaphthalenesulfonate, all encapsulated in 15-25% of a vinylidene chloride/methacrylate copolymer.

The effect of NISB on fluids made with formulation 3 was studied over the temperature range of 75 to 250° F. (24 to 121° C.). The fluid viscosity was decreased substantially by 0.5% NISB (especially above about 130° F. (about 54° C.)) and almost completely above about 175° F. (about 80° C.) and was decreased completely by 1% NISB above about 150° F. (about 66° C.). The fluid low shear viscosity was affected even more. As one example of its use, NISB is pumped as an aqueous solution as part of the pre-pad stage of a fracturing treatment. It leaks off into the formation; when it flows back after the job and contacts the VES/$CO_2$ fluid, the fluid is broken.

EPNS is an encapsulated breaker. The encapsulated material breaks the VES fluid by disrupting the electrolyte balance of the surfactant. EPNS is, for example, pumped as part of the slurry stage in a fracture treatment and is thus placed with the proppant in the fracture. When the fracture closes, the closure stress crushes the coating of the EPNS and releases the encapsulated breaker material. Unfoamed fluids made with formulation 3 were broken by this encapsulated breaker. Depending upon the surfactant concentration, we have found that about 7 to about 10 ppt (about 0.8 to about 1.2 g/L) is a suitable concentration of EPNS. To confirm this, we tested foamed broken fluid with the foam rheometer. When an unfoamed fluid was broken with 10 ppt (1.2 g/L) of EPNS and then foamed, that foamed fluid had much lower viscosity than one made without prior treatment with crushed EPNS. In addition, the foam half life of the broken fluid was also much shorter, which further ensures the ease with which the broken fluid is cleaned up.

Since the concentrate may need to be stored or pumped at low temperature under certain conditions, its low temperature stability and pumpability are important. The fluid may also be stored for a certain period of time at high temperatures, so its long term high temperature stability was investigated. Investigation of formulation 3 surfactant concentrate viscosity as a function of temperature showed that it is still very pumpable even at about 20° F. (about −7° C.).

Aging tests of formulation 3 concentrate were done at low and high temperatures to mimic cold and hot storage environments. Although the temperature of about 150° F. (about 66° C.) that was picked to examine high temperature conditions is higher than realistic, surfactant concentrate decomposition (if any) was accelerated at this temperature. An aging test for a comparatively short time at about 150° F. (about 66° C.) showed whether the chemicals in the surfactant concentrate were stable for much longer times at field conditions. The tests were done by storing the surfactant concentrates in a water bath at about 150° F. (about 66° C.) and in a freezer at about 20° F. (about −7° C.). At designated times, portions of the surfactant concentrates were removed and aqueous fluid samples were prepared from them using 3.37% concentrate in water containing 2% KCl. The rest of the surfactant concentrate stayed in the hot or cold environment for further aging. Unfoamed fluids made with hot or cold aged formulation 3 were than tested with the Fann 50 rheometer and the viscosities were compared to the viscosities of fluids made with un-aged concentrate. Neither aging at high temperature nor at low temperature for 3 months had any detrimental effect on the performance of formulation 3 surfactant concentrate.

Figure 4:
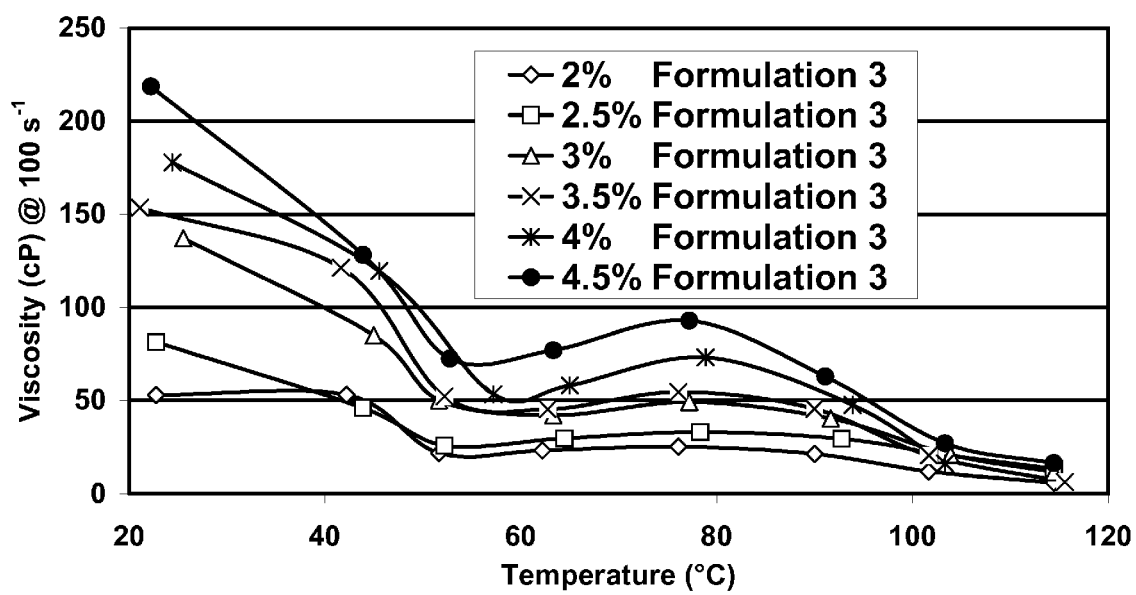
FIG. 4 shows viscosity temperature profiles of unfoamed fluids made with various concentrations of a fixed ratio of synergistic co-surfactant to surfactant.
Figure 5:
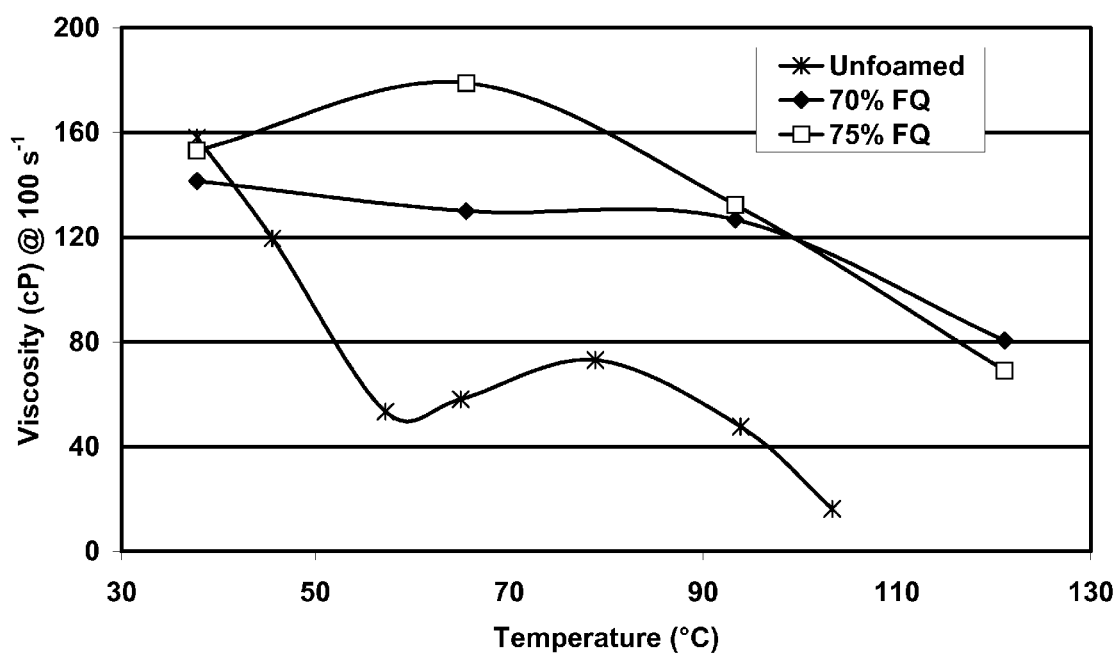
FIG. 5 shows viscosity temperature profiles of unfoamed and $CO_2$ foamed fluids made with a synergistic co-surfactant and a surfactant.

The effect of the concentration of formulation 3 was investigated. Shown in FIG. 4 is the viscosity temperature profile of unfoamed fluids made with formulation 3 in 2% KCl. Increasing the formulation 3 concentration increased the fluid viscosity over most of the temperature range. Above about 230° F. (about 110° C.), the fluids had very little viscosity and increasing the formulation 3 concentration did not help. As shown in FIG. 5, the viscosity profile of an unfoamed fluid made with 4% of formulation 3 in 2% KCl was compared to the same fluid foamed with $CO_2$ at 70% and 75% foam quality. The $CO_2$ foamed fluid viscosities were higher than the unfoamed fluid viscosity over almost the entire temperature range studied. Furthermore, foaming with $CO_2$ extended the fluid temperature upper limit by more than about 50° F. (more than about 28° C.).

Figure 6:
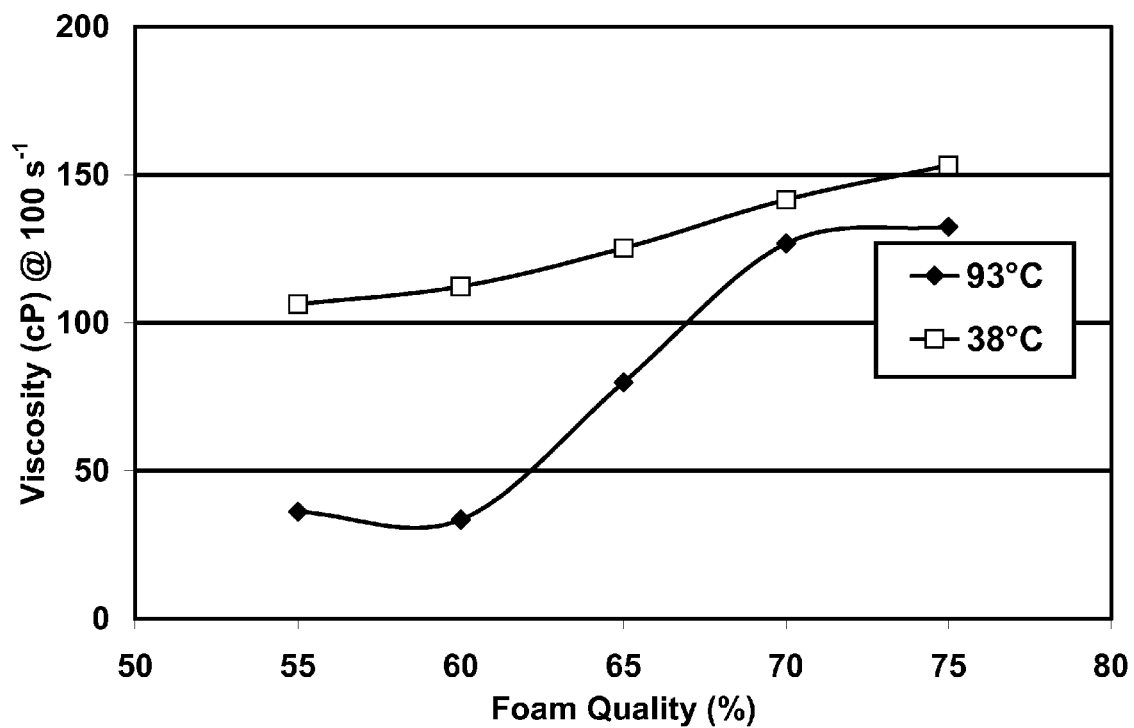
FIG. 6 shows the viscosities of a $CO_2$ foamed fluid made with a synergistic co-surfactant and a surfactant at different foam qualities and temperatures.

The effects of $CO_2$ foam quality were investigated in more detail. It was found that $CO_2$ foamed fluid viscosities were directly related to foam quality. For $CO_2$ foamed fluids made with formulation 3 in 2% KCl to have viscosities greater than about 100 cP at 100 $s^{-1}$ shear rate, the foam quality generally had to be greater than about 60%. For example, FIG. 6 shows the viscosities of $CO_2$ foamed fluid made with 4% of formulation 3 in 2% KCl at different foam qualities at 100° F. (about 38° C.) and at 200° F. (about 93° C.). It can be seen that at the higher temperature the viscosity increased dramatically when the foam quality was at least about 60%. At the lower temperature viscosity increased with foam quality but the effect was not as great. This foam quality reduced the liquid fluid (hydrostatic) load and provided good foam fluid viscosity. Foam qualities too high (i.e. above about 80%) tended to make the foam texture difficult to control and there is the possibility of inverting the internal and external phase of the foamed fluid. If inversion happens, the viscosity of the foamed fluid could drop to very low values.

Figure 7:
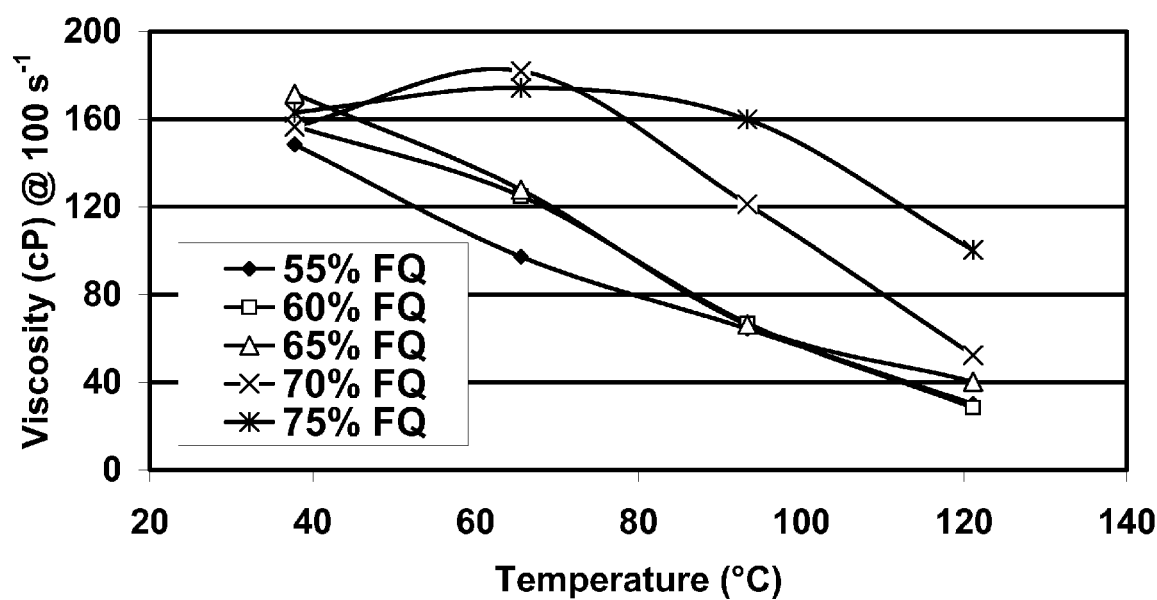
FIG. 7 shows the effect of foam quality and temperature on the viscosity of $CO_2$ foamed fluids made with a synergistic co-surfactant and a surfactant.

FIG. 7 shows the viscosities of $CO_2$ foamed fluid made with 4.5% of formulation 3 in 2% KCl at different foam qualities at temperatures ranging from 90° F. (about 32° C.) to 250° F. (about 121° C.). At 90° F. (about 32° C.), the viscositie were all about the same at foam qualities from 55 to 75%. At higher temperatures, higher foam qualities clearly gave higher viscosities. At this formulation 3 concentration, for each foam quality there was a temperature above which the foam viscosity started to decrease, for example about 200° F. (about 93° C.) for 75% foam quality, about 150° F. (about 66° C.) for 70% foam quality, and about 90° F. (about 32° C.) for lower foam qualities. Experiments not shown indicated that the behavior was similar at formulation 3 concentrations down to at least as low as about 2.5%, except that the viscosities were lower for any combination of temperature and foam quality and that at lower formulation 3 concentrations the effects of varying foam quality were less pronounced but still significant.

Experiments (not shown) have indicated that foams using the suitable formulations discussed here are usually generated satisfactorily during normal field mixing and pumping procedures. However, a foam generator may be used if desired.

Experiments (not shown) have indicated that the fluids of the invention are compatible with fibers used, for example as cleanout aids or to inhibit proppant flowback and sand and particle migration.

Figure 8:
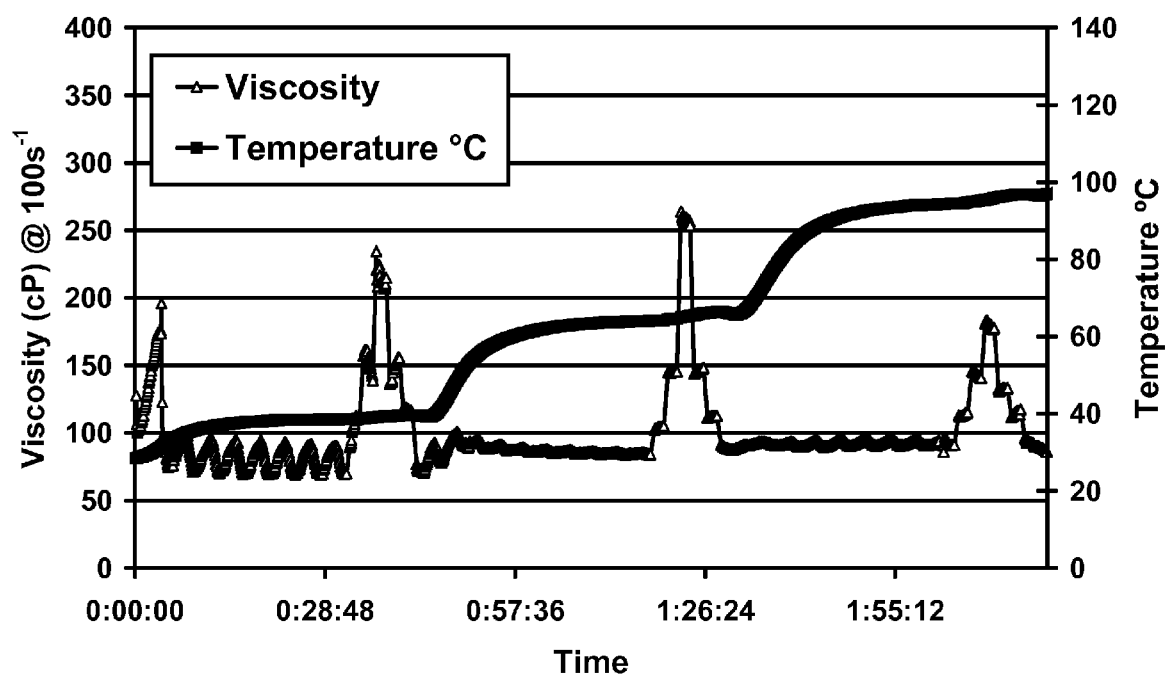
FIG. 8 shows the foam rheology of a $CO_2$ foamed fluid containing two synergistic co-surfactants.

FIG. 8 gives the foam rheology results with a fluid that contained 3% formulation 1, 0.19% DMB, 0.03% LEC, and 0.2% tetramethyl ammonium chloride. In FIG. 8 the times are given in the format x:yy:zz, that stands for x hours, yy minutes, and zz seconds. It can be seen this fluid containing a combination of synergistic co-surfactants provided a viscous foam stable to at least about 207° F. (about 97° C.). It is believed that stable viscous foams would have been obtained at higher temperatures but the experiments were not done. On the figure, the sets of higher viscosities represent reductions of the shear rates from 100 to 75, 50, and 25 sec$^{-1}$. These results were obtained on a Chandler foam rheometer in a 0.1750 or 0.2055 inch (0.445 or 0.522 cm) inside diameter capillary at a volumetric flow rate of 0.02 to 0.09 in$^3$/sec (0.33 to 1.47 cm$^3$/sec). The test was performed by continuously circulating the fluid in the capillary loop at different temperatures. The viscosity values were calculated from the pressure drops within a segment of the foam loop.

Figure 9:
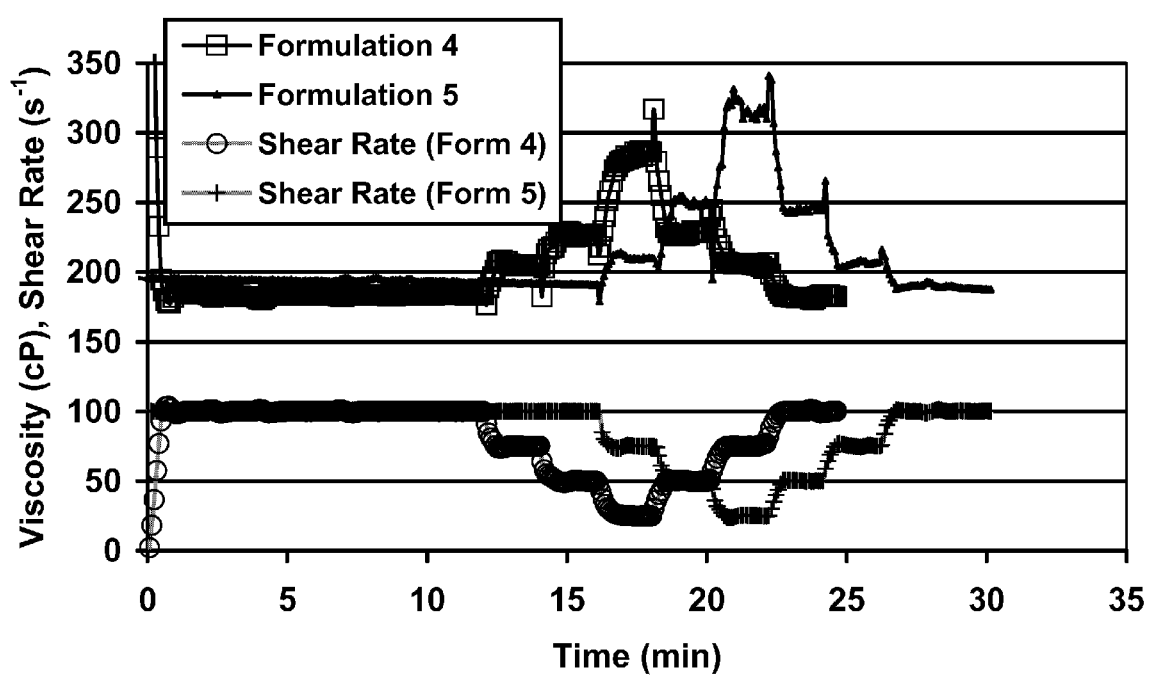
FIG. 9 compares the foam rheologies of $CO_2$ foamed fluids made with a synergistic co-surfactant and a surfactant and with a polymer-based fluid.

The carbon dioxide foamed VES fluids of embodiments of the invention are comparable in viscosity to carbon dioxide foamed polymer fluids that are currently in use for fracturing. FIG. 9 shows a comparison of the fluid viscosities at about 150° F. (about 66° C.) of formulation 4 (4% formulation 1 and 0.5% DMB in 2% KCl) and formulation 5 (a fluid commonly used in foamed fracturing, containing the equivalent of 40 pounds of guar per thousand gallons of fluid (about 4.8 g/L), made by adding to tap water 0.9 volume percent of a 50/50 weight percent mixture of guar in diesel, 0.2 volume percent tetramethyl ammonium chloride, 0.025 volume percent of a bactericide, 0.1 volume percent coco dimethyl ammonium chloride, and 0.6 volume percent of an approximately 25-50 weight percent aqueous mixture of $C_6$-$C_{10}$ alcohol ethoxysulfate). The foam quality of the VES fluids was about 70% and the foam quality of the polymer fluid was about 65%. The VES fluid performance was very comparable to that of the polymer.

We claim:

1. A fluid composition comprising a zwitterionic viscoelastic surfactant, carbon dioxide in a separate phase and a synergistic co-surfactant that co-operatively stabilizes the carbon dioxide-water interface and wherein the ratio of surfactant to co-surfactant is from about 5:1 to about 15:1, wherein the foam quality is from about 55% to about 75%, and wherein the synergistic co-surfactant improves the compatibility of the viscoelastic surfactant with the carbon dioxide wherein the zwitterionic viscoelastic surfactant is a betaine and the synergistic co-surfactant is $C_{12}$ alkyl dimethyl benzyl ammonium chloride.

2. A fluid composition according to claim 1, further comprising water, wherein said viscoelastic surfactant is present in a concentration of from about 0.3 to about 10%, and said synergistic co-surfactant is present in a concentration of from about 0.008 to about 4%, wherein the foam quality is from about 55% to about 75%.

3. The fluid composition of claim 1 wherein the betaine is selected from oleylamidopropyl betaine and erucylamidopropyl betaine.

4. The fluid composition of claim 1 further comprising zirconium oxychloride.

* * * * *